Oct. 2, 1956   L. W. FAGG ET AL   2,765,023
METHOD OF MANUFACTURING A PACKING RING
Filed Oct. 12, 1953

INVENTOR.
LEO W. FAGG AND
CHESTER L. SHARP
BY
ATTORNEY

United States Patent Office 2,765,023
Patented Oct. 2, 1956

2,765,023

METHOD OF MANUFACTURING A PACKING RING

Leo W. Fagg and Chester L. Sharp, Tulsa, Okla., assignors to Johnson-Fagg Engineering Company, Tulsa, Okla., a partnership comprised of Douglas O. Johnson and Leo W. Fagg Application October 12, 1953, Serial No. 385,581

1 Claim. (Cl. 154—33.1)

This invention relates to an improved packing ring and a method of manufacturing the same.

The type of packing ring in most general use at the present time is an annular ring, V-shaped in cross section. This type of ring is ordinarily formed out of a resilient material having a suitable fabric distributed therethrough. When using a plurality of such rings in a stuffing box or the like, the opposite ends of the stuffing box must be specially constructed to conform with the configuration of the rings. That is, one end of the stuffing box must have an annular recess and the opposite end must have an annular shaped shoulder or projection in order to retain the packing rings in the desired interfitting position. When excessive pressure is applied to a stack of such packing rings, the rings will ordinarily become deformed and will not provide an efficient seal around a rod or the like reciprocating therethrough. In addition, when the inner edges of the rings become slightly worn, the rings become useless in providing a seal as originally intended.

The present invention contemplates a packing ring utilizing a resilient annular shaped body portion with a fabric tubular shaped core bonded to the body portion and providing a lip extending from one end of the body portion. The center core provides the wearing surface for the ring and is preferably constructed of a long-wearing material, such as nylon. The upper and lower faces of the resilient body portion of the ring are substantially flat to facilitate stacking of the rings in end to end relation and to receive excessive longitudinal forces. When the rings are placed in end to end relation, or stacked, in a stuffing box, an excessive pressure applied to the ends of the stuffing box will merely compress the resilient body portions and provide a tighter seal of the wearing surfaces around the rod extending through the central portion of the stuffing box. The rings may be used until the fabric inner core is completely worn out.

An important object of this invention is to provide a high wear-resistant packing ring.

Another object of this invention is to provide a packing ring which will run dry an appreciable length of time, without damage, in the event of failure of lubrication.

Another object of this invention is to provide a packing ring which will maintain a seal after the wearing surface of the ring has become worn.

A further object of this invention is to provide packing rings which will withstand excessive pressures when placed in end to end relation in a stuffing box or the like.

A still further object of this invention is to provide a novel method of manufacturing a long wear-resistant packing ring.

Other objects and advantages of the invention will be evident from the following detailed description, read in conjunction with the accompanying drawings, which illustrate my invention.

Figure 1:
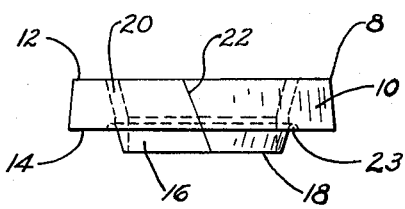
Figure 1 is a side elevational view of a novel packing ring.
Figure 2:
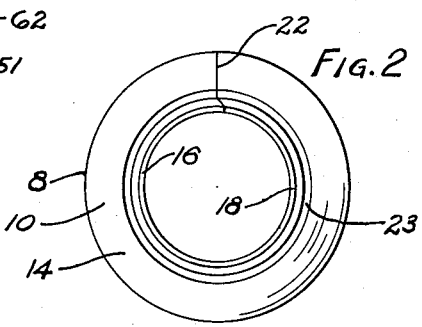
Figure 2 is an end view of the packing ring shown in Fig. 1.

Referring to the drawings in detail, and particularly Figs. 1 and 2, reference character 8 generally designates a novel packing ring. The main body portion 10 of the packing ring 8 is annular in configuration with the outer periphery thereof slightly tapered as shown in Fig. 1. The opposite end faces 12 and 14 of the body 10 are substantially flat for purposes as will be hereinafter set forth.

A tubular shaped insert 16 extends into the body 10 and is bonded thereto. The insert 16 is preferably formed out of layers of wear-resistant fabric, such as nylon, impregnated with a vulcanizing gum, and the body 10 is formed out of a resilient material which will bond with the vulcanizing gum. The portion 18 of the insert 16 extending from the end face 14 of the body 10 has its outer periphery tapered inwardly away from the face 14 as clearly shown in Fig. 1. The opposite end portion 20 of the insert 16 is bent outwardly at the same angle as the tapered outer periphery of the portion 18. Thus, a plurality of the packing rings 8 may be placed in end to end relation with the portion 18 of one ring extending into the portion 20 of the adjacent ring. It will be noted that the bent portion 20 is slightly longer than the portion 18 to accommodate deformation of the rings 8 when compressed in a stuffing box or the like (not shown).

The ring 8 is split at an angle 22 to facilitate placement of the ring 8 around a rod or the like (not shown). An annular recess 23 is preferably provided in the lower face 14 of the body 10 around the lip or projection 18 to permit bending of the lip 18 without possibility of rupturing or cracking the body 10.

Figure 3:
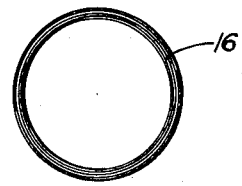
Figure 3 is an end view of the center core or insert of the packing ring shown in Figs. 1 and 2 at an intermediate stage of the manufacturing process.

In forming the insert 16, a suitable wear-resistant fabric, such as nylon, is impregnated with a vulcanizing gum and then wound into tubular form as shown in Fig. 3. The preferred method of accomplishing the impregnation of the fabric is to provide two receptacles (not shown) containing uncured vulcanizing gum, such as an uncured oil resistant hycar rubber base material, mixed with a suitable solvent, such as methyl ethyl ketone and chlorobenzene. A strip of nylon material of sufficient porosity (for example, fifty percent porosity) to attain a good bond with the vulcanizing gum is passed through one of the above-mentioned receptacles. The vulcanizing gum will thereby enter the porous nylon material.

This first coat or layer of vulcanizing gum is heated until the solvent is dissipated, leaving only the vulcanizing gum in the fabric in a tacky state. The nylon is then immersed in the second body of vulcanizing gum and solvent and re-impregnated with the vulcanizing gum. The nylon strip is then again heated until the newly acquired solvent is dried and until the second coat of vulcanizing gum assumes a tacky condition. This second drying operation may be readily accomplished by winding the nylon strip onto a drying reel in lieu of heating or in conjunction with heating the nylon.

After the nylon is completely impregnated with the vulcanizing gum, it is wrapped around a suitable mandrel (not shown) to provide the tubular shape as shown in Fig. 3. Ordinarily six wraps of the nylon strip will provide an insert 16 of suitable thickness for use in the packing ring 8.

An alternate method of impregnating the nylon material is to super-impose porous nylon and strips of uncured vulcanizing gum in alternating layers. These layers are then wound onto a mandrel to the desired thickness and cured by the application of heat and pressure. The vulcanizing gum thus enters into the porous nylon material and retains the layers of nylon in superimposed relation. After the curing step is completed, the tubular shaped impregnated nylon may be cut into inserts of the desired lengths by the use of a lathe or the like (not shown).

A coat of adhesive (not shown) is applied to the outer periphery of the insert 16 after either of the above forming operations. The insert 16 is then ready for placement over a pin 24 of a mold generally indicated at 26. The mold 26 (see Fig. 4) comprises an upper member 28 and a lower member 30. A circular recess or chamber 32 is provided in the upper face 33 of the lower circular shaped member 30 with the side walls thereof tapered slightly upwardly and outwardly when the mold 26 is in the position shown in Fig. 4. The upper edge 34 of the recess 30 is tapered outwardly at a greater angle for purposes as will be hereinafter set forth. A small bore 36 is also provided in the lower mold member 30 to receive the small end 38 of the pin 24. The bore 36 extends downwardly from the chamber 32 and is arranged concentrically therewith.

The upper half 28 of the mold 26 is also substantially circular in configuration and has a central bore 40 extending therethrough to slidingly receive the pin 24. A counter-bore 42 is provided in the lower face 44 of the member 28 concentrically around the bore 40. Immediately outward of the counter-bore 42 an annular shaped shoulder 46 extends downwardly from the face 44. The opposite edges 48 and 50 of the shoulder 46 are tapered downwardly and inwardly for purposes as will be hereinafter set forth. A smaller annular projection 51 extends downwardly from the shoulder 46 adjacent the inner edge 50 thereof. The projection 51 is rounded in cross section as clearly shown in Fig. 4. Also, an annular recess or chamber 52 is provided in the face 44 around the shoulder 46.

The pin 24 maintains the mold halves 28 and 30 in alignment and provides the core around which the packing ring 8 is formed. The pin 24 is of uniform diameter from the upper end 54 to a point 56 slightly above the lower reduced end portion 38. The remaining outer surface 58 is flared or tapered outwardly to taper the inner diameter of the packing ring 8 as will be more fully hereinafter set forth.

Figure 4:
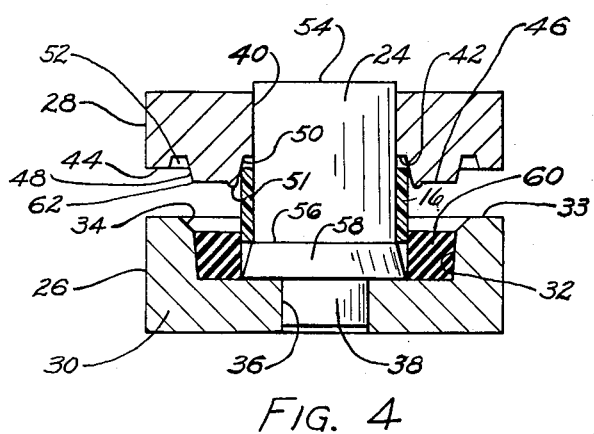
Figure 4 is a vertical sectional view of the molds used in forming the packing ring shown in Figs. 1 and 2 at the beginning of the forming operation.

Preparatory to using the mold 26, it is preferably heated to approximately 310 degrees Fahrenheit. Then the reduced end portion 38 of the pin 24 is inserted in the bore 36 of the lower mold member 30 in the manner shown in Fig. 4. A strip of uncured vulcanizing gum 60, such as uncured oil resistant hycar rubber base material, is placed in the chamber 32 around the pin 24. The strip 60 is substantially square in cross section and fills the chamber 32 up to the tapered edge 34 thereof. Next, the previously formed insert 16 is slipped over the upper end 54 of the pin 24, and the upper member 28 of the mold 26 is placed over the pin 24 on top of the insert 16 as illustrated in Fig. 4.

The mold halves 28 and 30 are then forced together by any suitable means such as a hydraulic ram or the like (not shown). As the members 28 and 30 are moved into contacting relation, the insert 16 is forced downwardly over the flared portion 58 of the pin 24, with the upper end portion 18 of the insert 16 extending into the counter-bore 42 of the member 28. Thus, the outer periphery of the portion 18 of the insert 16 will be tapered upwardly and inwardly and the opposite portion 20 of the insert 16 will be bent outwardly and downwardly. It should be noted here that the flared portion 58 of the pin 24 is of slightly greater length than the tapered face 50 of the projection 46 in order that the end portion 18 of the insert 16 will be of shorter length than the bent portion 20.

Figure 5:
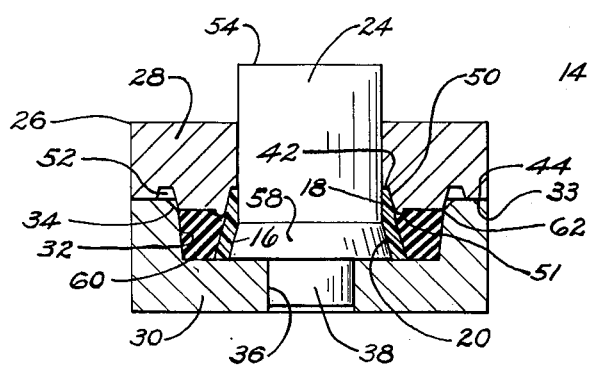
Figure 5 is a view similar to Fig. 4 with the molds in contacting relation.

When the mold members 28 and 30 are in contacting relation as shown in Fig. 5, the strip 60 will be compressed and the outer edge 62 of the shoulder 46 is in contacting relation with the upper edge of the chamber 32. Any excess gum contained in the strip 60 will be forced past the edge 62 of the shoulder 46 into the chamber 52 of the upper mold member 28.

The mold members 28 and 30 are retained in this contacting relation by the use of suitable C-clamps or the like (not shown) and the entire mold 26 is heated to cure the vulcanizing gum 60 and bond the gum 60 to the insert 16. The temperature at which the mold 26 is heated for this curing operation will, of course, depend upon the material utilized to impregnate the insert 16 and compose the strip 60. With the preferred material described above, the heating temperature will approximate 310 degrees Fahrenheit and the curing operation will take approximately one hour. After the curing operation, the mold 26 is disassembled and the excess gum 60 which has been forced into the recess 52 of the upper mold member 28 is trimmed to provide a finished packing ring 8 as shown in Figs. 1 and 2. The packing ring 8 is then split on the bias at 22 by any suitable means (not shown).

The packing ring 8 may be readily modified for use as the end packing ring in a stuffing box (not shown). When used as such, there is no lip or projection 18 to enter the bent portion 20 of the insert 16. In manufacturing these modified rings (not shown), it is simply necessary to utilize a center pin (not shown) in place of the pin 24 having no flared portion similar to the flared portion 58 of the pin 24. It will be readily apparent that a packing ring (not shown) formed on such a pin will have a uniform inner diameter to contact a rod extending therethrough over the entire length of the ring.

Figure 6:
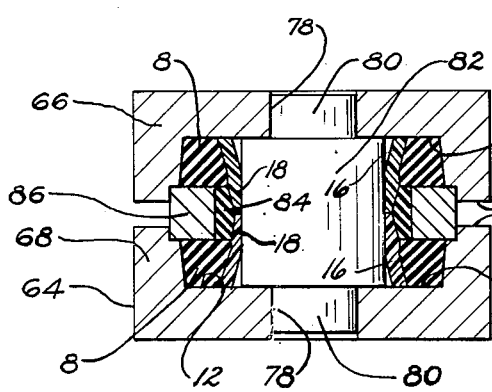
Figure 6 is a vertical sectional view of a modified mold for forming a modified packing ring.
Figure 7:
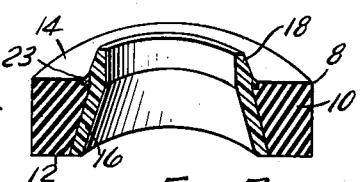
Figure 7 is a perspective view on a slightly enlarged scale of a portion of the packing ring shown in Fig. 1 and in an inverted position from that shown in Fig. 1.

In certain installations, such as oil well stuffing boxes and the like (not shown), it is desirable to provide what is commonly called a "pack-off" ring to retain a pressure when the packing rings 8 are being changed. One method of forming such pack-off rings is illustrated in Fig. 6. In this method, a modified mold, generally indicated at 64, and comprising upper and lower members 66 and 68 is utilized. Identical circular chambers 70 and 72 are provided in the adjacent end faces 74 and 76 of the upper and lower mold members 66 and 68 respectively. In addition, a central bore 78 is provided transversely in each of the mold members 66 and 68 concentrically with the respective chambers 70 and 72. The bores 78 are provided to slidingly receive the opposite reduced end portions 80 of a central pin 82.

In operation of the mold 64, it is pre-heated as described above and one end 80 of the pin 82 is inserted in the bore 78 of the lower mold member 68 in the manner shown in Fig. 6. A packing ring 8 is then slipped over the pin 82 into the chamber 72 with the end face 12 of the packing ring 8 facing downwardly. A strip 84 of uncured vulcanizing gum is then placed over the projection 18 of the packing ring 8 and a metal ring 86 is placed around the strip 84. Subsequently, another packing ring 8 is slipped over the pin 82 with the projection 18 thereof extending downwardly into the strip 84 and into contact with the projection 18 of the opposite packing ring 8. The upper member 66 of the mold 64 is then placed over the pin 82 in the manner illustrated in Fig. 6 and the members 66 and 68 are forced into contact with the ring 86. Sufficient pressure is applied to the members 66 and 68 to force the strip 84 into close contacting relation with the packing rings 8. The mold 64 is retained in this position and heated as described above for the mold 26 to cause a bonding of the strip 84 to both of the packing rings 8. The resulting structure is a unitary resilient pack-off ring substantially C-shaped in cross section having a continuous inner core of long wear-resistant material.

From the foregoing, it is apparent that the present invention provides a novel packing ring having a central core and projecting lip of long wear-resistant material. When pressure is applied to the opposite ends of the packing ring, the fabric core will be forced into contact with a rod or the like extending therethrough and provide an efficient seal. Any wear of the central core may be compensated for by further compressing the main body portion of the packing ring to provide the maximum service life for the ring. When the packing ring is formed with the preferred material, it may be run without lubrication for an extended period without damage. It is also apparent that the present invention provides a novel method of manufacturing a long wear-resistant packing ring.

Changes may be made in the combination and arrangement of parts as heretofore set forth in the specification and shown in the drawings, it being understood that any modification in the precise embodiment of the invention may be made within the scope of the following claim without departing from the spirit of the invention.

We claim:

A method of manufacturing an annular packing ring, consisting of coating permeable nylon material with a mixture of uncured rubber base vulcanizing gum and solvent, drying the solvent, re-coating the nylon material with a mixture of uncured rubber base vulcanizing gum and solvent, winding the coated nylon material into tubular form, applying an adhesive to the outer surface of the coated nylon tube, placing the nylon tube inside an annular ring of uncured vulcanizing gum and subsequently pressing the major portion thereof into the annular ring, and bonding the coated nylon tube to the annular ring of uncured vulcanizing gum.

References Cited in the file of this patent
UNITED STATES PATENTS

| | | |
|---|---|---|
| 1,363,565 | Christenson | Dec. 28, 1920 |
| 1,466,086 | Christenson | Aug. 28, 1923 |
| 2,052,603 | Christenson | Sept. 1, 1936 |
| 2,621,375 | Bacon et al. | Dec. 16, 1952 |
| 2,639,198 | Kirkham | May 19, 1953 |